United States Patent [19]

Alack

[11] 4,182,386
[45] Jan. 8, 1980

[54] CLOSED SYSTEM AND CONTAINER FOR DUST FREE LOADING AND UNLOADING OF POWDERED MATERIALS

[75] Inventor: Charles S. Alack, St. Louis, Mo.

[73] Assignee: Semi-Bulk Systems, Inc., St. Louis, Mo.

[21] Appl. No.: 855,935

[22] Filed: Nov. 30, 1977

[51] Int. Cl.² ............................................. B65B 1/32
[52] U.S. Cl. .......................................... 141/83; 141/93;
        141/314; 108/55.1; 206/444; 222/195; 361/215
[58] Field of Search ........................... 302/53, 54, 35;
        222/195, 462; 251/338; 137/527.8; 220/203,
        206; 361/212, 215; 141/1–12, 369–381, 114,
        312–317, 390, 325–327, 59, 291–295, 93, 83;
        108/55.1, 901; 206/444

[56] References Cited

U.S. PATENT DOCUMENTS

| Re. 23,504 | 5/1952 | Carter | 141/5 |
| 2,531,743 | 11/1950 | Ray | 141/5 |
| 2,815,621 | 12/1957 | Carter | 141/5 |
| 2,954,203 | 9/1960 | Carter | 141/5 |
| 3,149,649 | 9/1964 | Hix | 141/93 |
| 3,777,775 | 12/1973 | Handleman | 302/52 |
| 4,007,694 | 2/1977 | Fowler et al. | 108/55.1 |
| 4,038,693 | 7/1977 | Huffing et al. | 206/444 |
| 4,054,161 | 10/1977 | Alack | 141/12 |

Primary Examiner—Houston S. Bell
Attorney, Agent, or Firm—Koenig, Senniger, Powers and Leavitt

[57] ABSTRACT

A closed system for filling a container with a load of powdered, granular, or other dry fluent material and for unloading the load substantially without the emission of dust to the atmosphere. The container has an opening in its top which may be sealingly secured to a filling head during during filling and closed by a removable cover. The filling head is connected to a dust receiver for removing dust laden air displaced from within the container as the load is delivered to the container. The container used with this system may be adapted for fluidized unloading of the powder substantially without the release of dust.

26 Claims, 9 Drawing Figures

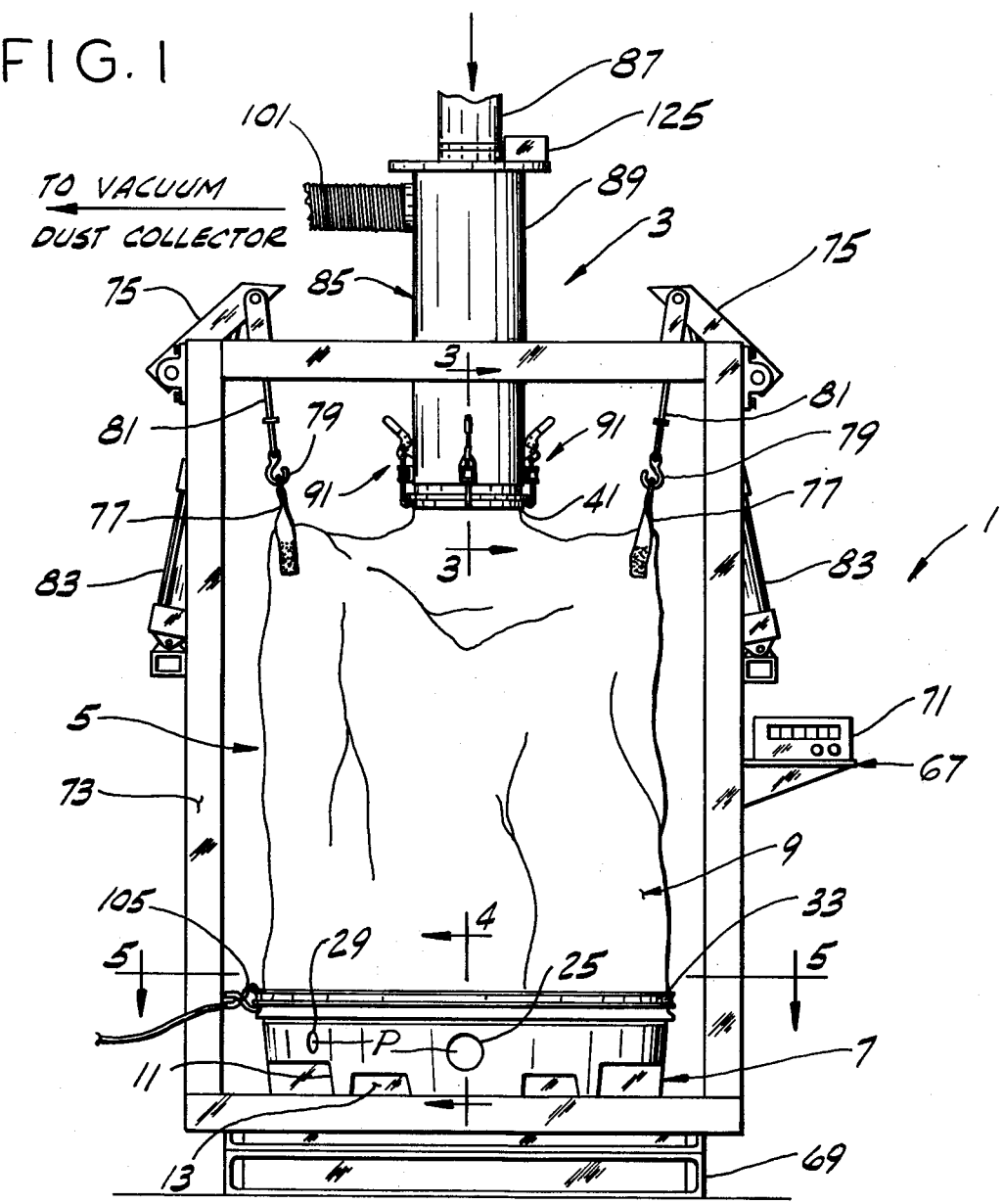
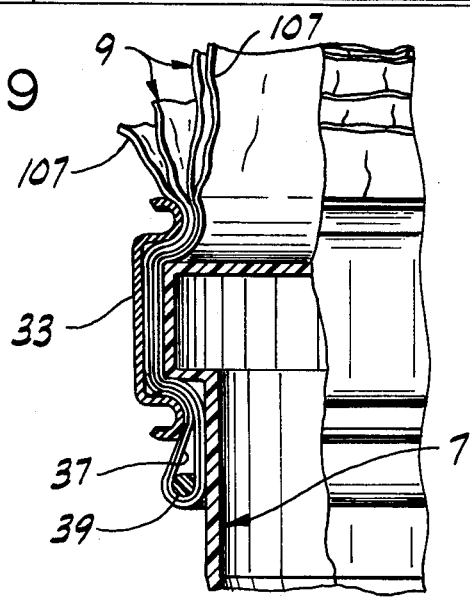

U.S. Patent  Jan. 8, 1980  Sheet 4 of 4  4,182,386
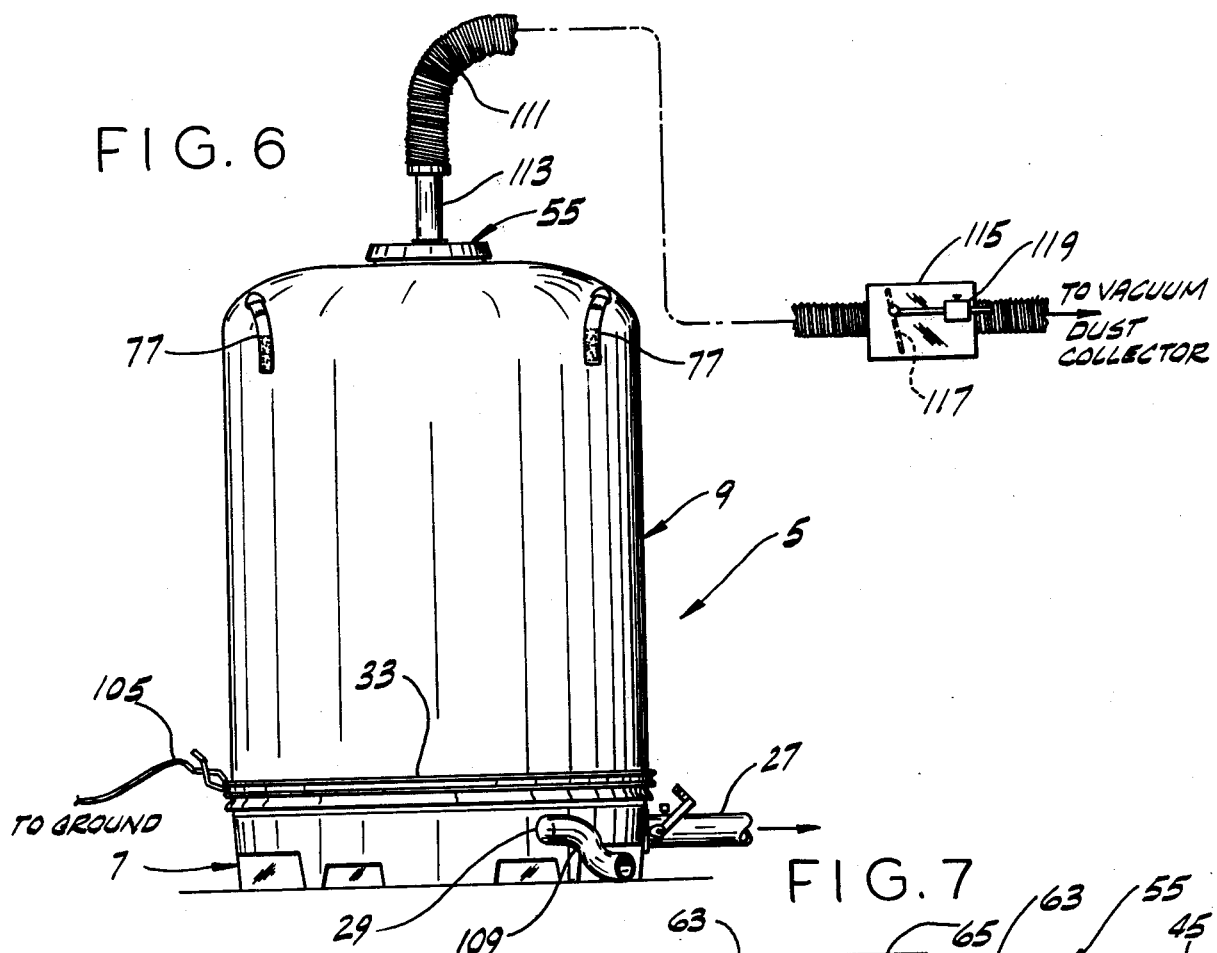
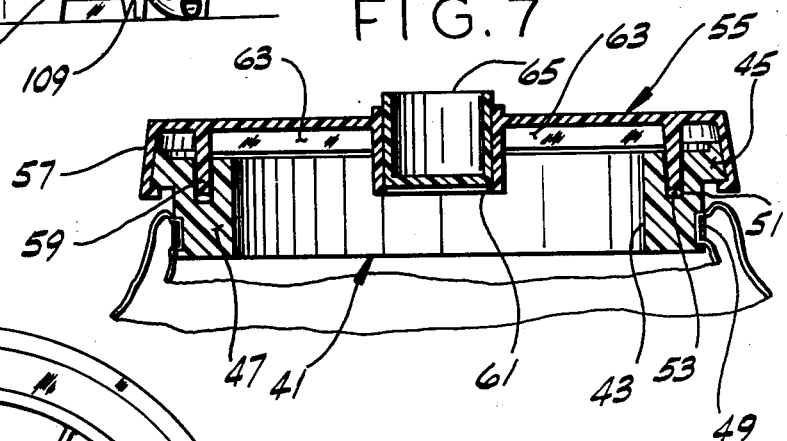
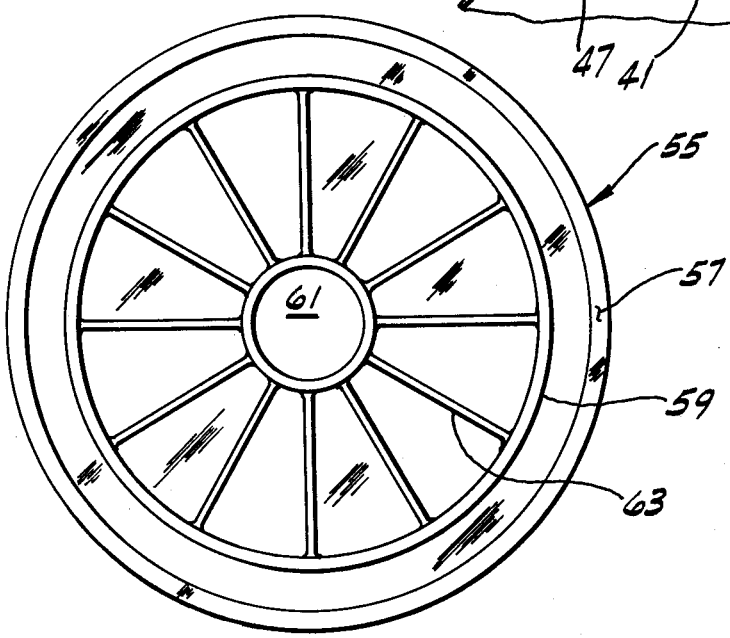

CLOSED SYSTEM AND CONTAINER FOR DUST FREE LOADING AND UNLOADING OF POWDERED MATERIALS

BACKGROUND OF THE INVENTION

This invention relates to material handling apparatus, and more particularly to a closed system for handling powdered or fine granular, fluent materials, the system enabling the fluent material to be readily loaded into and unloaded from a container substantially without the discharge or escape of dust.

In handling many powdered or granular fluent materials, such as paint pigments, cement, diatamoceous earth and the like, and especially in handling toxic powdered materials, it has long been a problem to effect rapid and controlled loading of the material into its container and the rapid unloading of the material without dispensing substantial quantities of dust into the atmosphere. For example, in filling paper bags, drums, or other containers with a powder, substantial quantities of dust are often generated. While this dust can oftentimes be collected or otherwise controlled at the factory in which the bags are filled, the end use of the bags may result in the excessive release of dust which cannot readily be controlled. This release of dust, especially the release of toxic dust, not only creates a housekeeping problem in the area of use, but the toxic dust may constitute a health hazard to many workers and other personnel in the general vicinity.

As disclosed in U.S. Pat. Nos. 3,777,775 and 4,007,694 and in my U.S. patent application Ser. No. 801,865, filed May 31, 1977, issued as U.S. Pat. No. 4,149,755, Apr. 17, 1979, containers are now commercially available from Semi-Bulk Systems, Inc. of St. Louis, Mo., under their registered trademark "Air Pallet" for receiving, transporting and unloading "semi-bulk" quantities (e.g., 2000-4000 pounds or more) of powdered or finely divided granular material. Generally, such containers have a rigid molded plastic pallet base and a flexible plastic film bag secured thereto. The bag is open at its mouth, and, as shown in U.S. Pat. No. 4,054,161, equipment is presently available for filling the open mouth bags of such containers with powdered material while minimizing the dust generated during filling. Specifically, this prior filling apparatus has a collapsible umbrellatype closure which is selectively expanded to hold the mouth of the bag open, to seal the mouth of the bag while the product is being delivered into the bag via a vertical fill tube and to support the bag during filling. Upon completion of filling of the bag, the umbrella seal is collapsed and raised, and workmen then manually gather the sides of the bag to the center, twist the open mouth shut, and secure it with a twisted wire tie. However, upon gathering of the open bag a certain amount of dust from within the container is oftentimes expelled. Workmen may thus be exposed to the dust while they are manually gathering and tying the bag closed. However, when handling toxic materials, it may be unacceptable to expose workmen to even small quantities of dust.

It is inherent that a small quantity (for example, a few pounds) of the powdered material will remain in the container after it has once been filled and unloaded. As described above, the bags of prior containers must be fully opened prior to refilling in the filling apparatus. This exposes workmen to the residual dust within the container. Still further, the bags of the prior containers must be periodically replaced. This also may expose workmen refurbishing the containers to toxic dust remaining within used containers.

Reference may also be made to such U.S. Pat. Nos. as Re. 23,504, 2,531,743, 2,815,621 and 2,954,204 which disclose various apparatus for filling containers with powders in the same general field as the present invention.

SUMMARY OF THE INVENTION

Among the several objects and features of this invention may be noted the provision of a closed system for filling a container with a load of powdered or granular material, sealably closing the container, and unloading the powdered material from the container substantially without the emission of dust; the provision of such a system in which the container is positively and sealably connected to filling apparatus while the container is being filled; the provision of such a system in which the container may be readily and rapidly closed after filling with a minimum exposure of personnel to dust from within the container; the provision of such a system in which substantially all of the load of powdered material may be easily and rapidly removed or unloaded from the container substantially without the escape of dust; the provision of such a system in which, after the container has been emptied, the container may be resealed to prevent the escape of any residual dust from within the container upon return shipment of the container; the provision of such a system in which the buildup of static electricity on the container during filling, storage, transporting and unloading may be minimized, the provision of such a system in which the containers are of durable and rugged construction such that they may be repeatedly reused without refurbishment; and the provision of such a system which does not require special training of personnel and in which the containers are of reasonable cost.

Briefly, a closed system of this invention involves filling a container with a load of powdered or granular fluent material and for closing the container such that the escape of dust during filling and closing of the container is substantially prevented. The system includes a container having a reclosable opening at its top, this opening being defined by a substantially rigid collar sealingly secured to the container. A cover is provided which is releasably secured to the collar for sealably closing the opening after filling the container. The system further includes means for filling the container with fluent material having means for delivery of the fluent material to the container, and means for releasably and sealably securing the collar to the delivery means during filling.

The system of this invention for filling a container with a load of powdered or granular material, and for unloading the load from the container substantially without the escape of dust further involves the use of a container defining an enclosed volume for containing the load and being adapted for the fluidized unloading of the powdered load. An opening is provided at the top of the container in communication with the volume and a porous diaphragm within the container at the bottom thereof defines the bottom of this volume. A plenum chamber is provided between the diaphragm and the bottom of the container and an inlet in the container is provided for the introduction of compressed air or other gas into the plenum chamber. The gas in the plenum chamber permeates through the diaphragm so as to fluidize the fluent material. An outlet is provided in the container for the discharge of fluidized material from therewithin. The opening at the top of the container is defined by a substantially rigid collar, and a removable cover adapted to be releasably fitted on the collar closes the opening. The system further comprises means adapted to be sealingly secured to the collar for filling the container with the fluent material and for removing air from within the container displaced upon filling of the container substantially without the emission of dust. Still further, the system includes means adapted for communication with the volume so as to vent the volume during fluidization of the load and so as to maintain the pressure within the volume within a predetermined pressure range during unloading substantially without the emission of dust.

In another embodiment of the closed system of this invention, the container is defined as being adapted to receive and contain a load of powdered material and for the fluidized unloading of the load, the container including a substantially rigid base, a bag of flexible sheet material sealably secured to the base, a porous diaphragm in the container overlying the base and constituting the bottom of the bag. A plenum chamber is defined between the diaphragm and the base and an inlet is provided in the base for the introduction of compressed air into the plenum chamber, this compressed air permeating through the diaphragm and fluidizing the load. An outlet in the container is provided for the discharge of the fluidized material. An opening at the top of the bag is defined by a substantially rigid collar sealably secured to the bag. A cover is provided for sealably closing this opening. The system further comprises means for filling the container with the fluent powdered material and means is provided for facilitating the removal of dust and air from within the container displaced during filling. The dust removal means comprises a head adapted to sealingly engage the collar. The filling means includes a tube within the head for the delivery of the fluent material into the bag, the head being adapted for connection to a vacuum dust collector. The filling means further comprises a scale for weighing the fluent material delivered to the container during filling, the scale including means attachable to the bag for supporting the bag in erect position with its collar sealingly secured to the head during filling.

A container of this invention is defined as comprising a substantially rigid base, a flexible wall bag sealably secured to the base defining a volume for containing a load of powdered material. A porous diaphragm in the container overlies the base and constitutes the bottom of this volume and defines a plenum chamber between the diaphragm and the base. An inlet is provided for the introduction of compressed gas into the plenum chamber, the compressed gas permeating through the diaphragm and fluidizing the powdered load. An outlet is also provided in the container for the discharge of fluidized material. An opening in the top of the bag in communication with the volume within the bag is provided through which the load is delivered into the container during filling, the opening being defined by a substantially rigid collar sealably secured to the bag. A cover is provided which is removably and sealably securable to the collar for sealably closing the opening.

Other objects and features of this invention will be in part apparent and in part pointed out hereinafter.

BRIEF DESCRIPTION OF THE DRAWINGS

FIG. 1 is a front elevational view of a system of this invention showing a container in position on a scale for being filled with a load of powdered, granular, or other dry fluent material by a filling apparatus in such manner as to substantially prevent the escape of dust to the atmosphere during filling;

FIG. 6 is an elevational view of the container during fluidized unloading of the load;

FIG. 7 is a cross-sectional view of the upper portion of the bag showing a rigid collar sealably secured thereto which in turn is sealably enclosed by a removable cover;

FIG. 8 is a bottom plan view of the cover shown in FIG. 7; and

FIG. 9 is a view similar to FIG. 4 illustrating a different construction of the bag having an inner, electrically conductive liner.

Corresponding reference characters indicate corresponding parts throughout the several views of the drawings.

DESCRIPTION OF THE PREFERRED EMBODIMENTS

Figure 2:
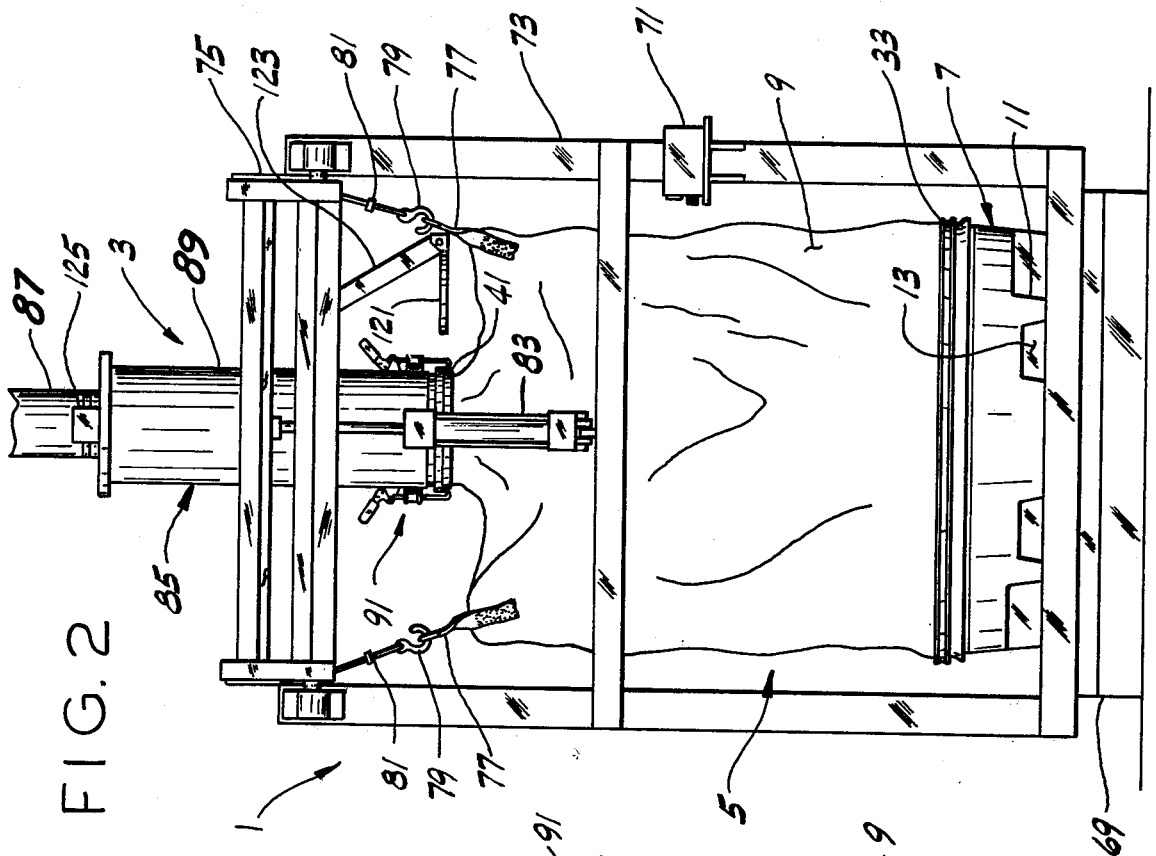
FIG. 2 is a side elevational view of the system shown in FIG. 1.

As shown in the drawings, this invention relates to a closed system, as is generally indicated at 1, including filling apparatus 3 and a container 5. The filling apparatus is adapted to fill the container with a load of powder, fine granular or other dry fluent material. The container is adapted to sealably enclose the load therewithin and is adapted to unload the load from the container substantially without the escape of dust to the atmosphere.

Figure 4:
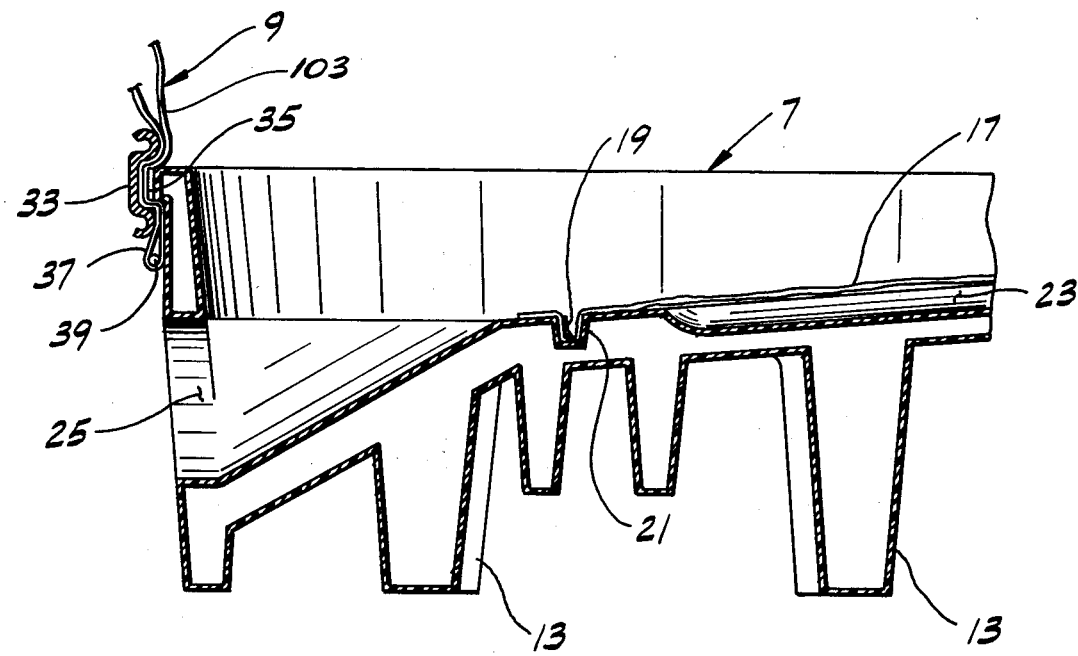
FIG. 4 is an enlarged cross-sectional view of a portion of the container showing the container base and means for sealably securing a bag to the base.
Figure 5:
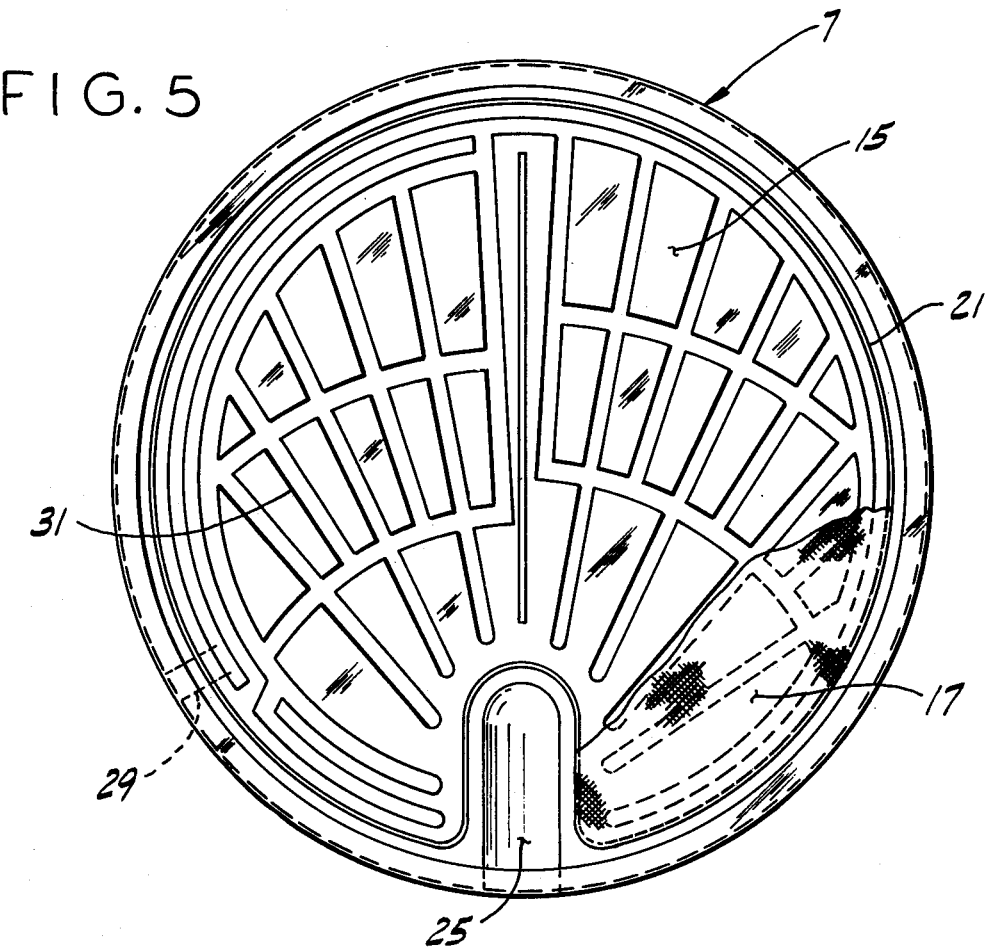
FIG. 5 is a transverse cross-sectional view of the container illustrating the base in plan with most of a fabric diaphragm overlying the base broken away for purposes of clarity.

Container 5 is shown to be generally similar to the above-discussed "Air Pallet" container. However, container 5 of this invention differs from prior containers in several important aspects as will hereinafter become apparent. Generally, container 5 includes a substantially rigid base 7 of molded high density polyethylene or other suitable synthetic resin material. A flexible wall bag 9 is sealably secured to the base for defining a volume therewithin in which a load of powdered material may be loaded and contained. While the size of container 5 is not critical to this invention, container 5 may preferably be so sized as to hold a so-called "semi-bulk" load of powdered material which may range from 500–4000 lbs. (227–1816 kg.) or more of powdered material. The quantity and volume of material contained by the container will, of course, depend on the physical properties of the powdered material. As shown in FIGS. 1 and 2, base 7 has a plurality of legs 11 for supporting the container and a plurality of openings 13 for permitting four-way entry of the tines of a forklift thereby enabling forklift transport of a loaded (or empty) container. In FIG. 5, the base is shown to be circular in plan and to have a so-called upper deck 15 which supports the load of powdered material within the container. The container is adapted to fluidize the load of powder therewithin for fluidized unloading of the powdered load. This allows rapid unloading of the powder. For example, approximately 4000 lbs. (1816 kg.) of powder may be unloaded in approximately 3-5 minutes by the container of this invention. The container further includes a porous diaphragm 17 of cloth or other fabric material secured to the outer periphery of deck 15 by means of a metal spline 19 which fits down into a groove 21 in the base and grips the diaphragm. The diaphragm substantially overlies deck 15 and defines a plenum chamber 23 between the deck and the diaphragm. As shown in FIG. 4, deck 15 slopes downwardly toward one side of the base and the latter has an opening 25 at the lowest portion of the deck through which fluidized powder may be readily discharged from the container during fluidization of the load. As shown in FIG. 6, an outlet conduit 27 may be releasably and sealably secured to the base in outlet 25 for conveying away fluidized material. The base also has an inlet 29 through which compressed air or other compressed gas may be introduced. Air inlet 29 is shown to be in communication with plenum chamber 23. Deck 15 includes a network of upwardly facing open channels 31 which serve to substantially uniformly distribute the compressed air within the plenum chamber during fluidization. Upon introduction of compressed air into the plenum chamber, air will permeate through diaphragm 17 and fluidize the powdered load bearing down against the diaphragm. Reference may be made to the above-mentioned U.S. Pat. No. 4,149,755 for further details of the base. As shown in FIG. 1, outlet 25 and inlet 29 are normally closed by removable plugs P which may be readily removed for unloading of the load and which may be readily inserted in the inlet and outlet openings for closing these openings.

Bag 9 is preferably made of a durable, tough air and water impervious flexible wall material, such as a high tensile strength cloth coated or laminated with a suitable plastic or rubber coating. For example, a polyester fabric coated with polyvinyl chloride on both faces may be used. Of course, other limp sheet materials, such as a suitable plastic film may also be used. The bag is open at its bottom and sealably secured to base 7 by a metal circumferential clamping band 33 in a manner similar to that described in the above-noted U.S. Pat. No. 4,149,755. As shown in FIG. 4, clamping ring 33 is generally channel-shaped in cross-section and is adapted to fit over an outwardly protruding flange 35 formed on base 7. The bottom margin of the bag is folded double to form a hem 37 and a limp cord 39 (e.g., a rubber band or a a fabric cord) is disposed within the hem. Bolts (not shown) joining the ends of the clamping ring may be tightened to securely draw the clamping ring in on the base and to sealably secure the bag to the base. In the event forces are applied to the bag which may tend to pull it from the base, cord 39 will engage the bottom of the clamping ring and will lock the bag relative to the clamping ring.

As best shown in FIGS. 1 and 7, the top of bag 9 is closed and it has a reclosable opening defined by a substantially rigid collar 41 sealably secured to the bag. Preferably, collar 41 is molded of a suitable synthetic resin material, such as high density polyethylene or the like, and it has a central opening 43 therethrough with an outwardly projecting flange 45 at its upper end. A so-called sleeve 47 extends down from flange 45 and bag 9 is sealably secured to the sleeve by means of a clamp ring 49. Collar 41 further has an upwardly facing circular groove 51 in its upper face for receiving a compressible seal 53. As shown in FIGS. 6-8, opening 43 and collar 41 may be readily sealed or opened by means of a reclosable cover, as generally indicated at 55. This cover is generally in the form of an inverted saucer having a first or outer downwardly extending flange 57 adapted to interengage the undersurface of flange 45 of collar 41 (see FIG. 7) and a second or inner downwardly extending flange 59 adapted to fit down into groove 51 and to sealably engage seal 53 thereby to sealably close opening 43 through the collar. As shown in FIG. 8, cover 55 has a central opening or aperture 61 and a plurality of radial ribs 63 interconnecting the walls defining the center opening and flange 59. A removable dust plug 65 is sealably inserted in and may be readily removed from opening 61. As best shown in FIG. 7, the unreinforced portion of cover 55 between inner flange 57 and outer flange 59 is so structured that it is bendable so that it may be manually bent up to permit the ready removal of the cover from collar 41.

Filling apparatus 3 of this invention is shown to include an electronic platform scale, as generally indicated at 67, including a weighing platform 69 and a digital read out console 71. For example, the scale 67 may be a commercially available unit, such as a model 3104 available from National Control, Inc. of Santa Rosa, Calif. Scale platform 69 is of sufficient size to hold a container 5. The scale platform also carries a frame 73 extending up above and generally surrounding a container positioned on the platform. Two sets of lifting arms 75 are pivotally carried by the frame, one set on each side of the container. Bag 9 has four cloth loops 77 sewn onto the upper portions thereof. Each set of lifting arms has a pair of hooks 79 attached thereto by lines 81. The lifting arms are selectively moved from a lower position (not shown) in which the hooks may be readily attached to loop 77 to a raised position (as shown in FIGS. 1 and 2) in which bag 9 is held in erect position for sealing engagement with the filling apparatus as will be hereinafter specified. Lifting arms 75 are raised and lowered by means of air cylinder units 83. Air pressure supplied to air cylinder 83 is regulated so as to limit the lifting forces applied to the bag. Thus, as powder is loaded into the container, the weight of the powder will stretch the bag taut. Upon the weight of the powder and the container exceeding the predetermined limit for which the air pressure was regulated, air cylinders 83 will retract thus lowering the lifting arms and the bag until pallet base 7 rests on scale platform 69. In this manner the bag can be held in an upright position as it is filled and the force applied to the bag can be limited to any desired level. Further, the majority of the weight of a filled container will be supported by the scale platform and a small fraction of the weight supported by the lifting arms. Because frame 73 is supported by scale platform 69, the lifting forces applied to the bag to hold it in erect position have no effect on the weight measured by the scale.

Filling apparatus 3 further comprises a delivery means comprising a delivery head, means for filling a container 5 with dry fluent material and means for removing air from within the container displaced upon the filling of the container. Delivery head 85 includes an inner fill conduit or tube 87 that communicates with the filling means and that is concentric within an outer dust collection conduit or tube 89 that communicates with the air removing means. The fill conduit is connected to a supply of powdered material (for example, the delivery conduit may lead to an overhead hopper) via a pipe (not shown) so that delivery of fluent powdered material into the container may be rapidly carried out. The delivery head 85 further includes a plurality (e.g., four) of hand-operated toggle clamps, as generally indicated at 91, carried on the outer face of the dust collection conduit 89 adjacent the lower end thereof for releasably and sealably securing collar 41 of a container to the delivery head.

Figure 3:
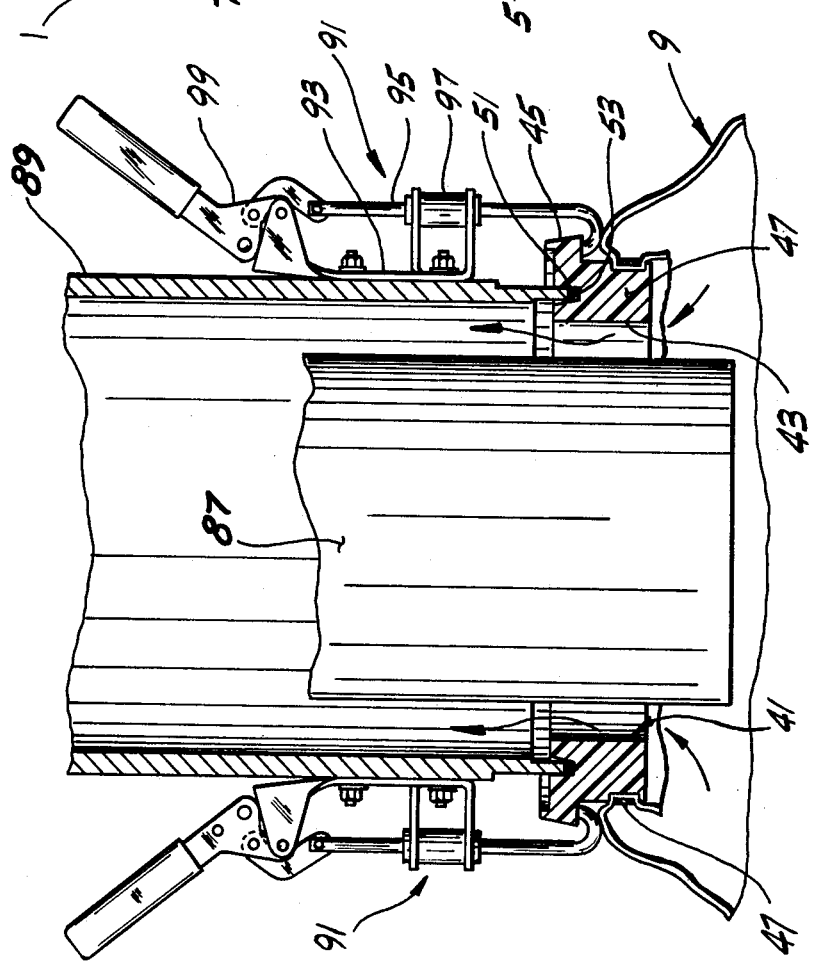
FIG. 3 is an enlarged vertical cross-sectional view of a portion of the filling apparatus taken along lines 3—3 of FIG. 1.

As shown in FIG. 3, each clamp 91 includes a base 93 bolted to conduit 89. A J-shaped clamping member 95 is slidably supported in a barrel 97 for axial vertical movement between a lowered unclamped position (not shown) in which the lower end of the J-shaped member is free of the under surface of flange 45 of collar 41 and a raised clamping position (as shown in FIG. 2) in which the J-shaped clamping member engages the under surface of flange 41 of the collar and draws the collar up into sealing relation with the delivery head. The clamp further includes an over center linkage and handle arrangement 99, such as Model CL150SPC available from the Carr Lane Manufacturing Co. of St. Louis, Mo., for moving the J-shaped clamping member between its clamped and unclamped positions and for locking it in its clamped position. As shown in FIG. 3, the lower end of the dust collection tube 89 is so sized as to fit into groove 51 of collar 41 so that the lower edge of the delivery head will compress and thereby sealingly engage seal 53 when the collar is drawn up by clamps 91.

As shown in FIG. 3, fill conduit 87 is concentric within dust collection conduit 89 so that an annular gap G is present between the inner walls of collar 41 and the fill conduit and between the dust collection conduit and the fill conduit. Of course, both the lower ends of the inner fill conduit 87 and the outer dust collection conduit 89 are in communication with the interior of bag 9 when filling the bag. As shown in FIG. 1, dust collecting conduit 89 is either connected via a flexible hose 101 to a vacuum dust collector (not shown) or connected back to the closed supply hopper (also not shown) which supplies material to the container and thus constitutes means for removing dust-laden air from within bag 9 displaced upon filling of the bag and for substantially preventing the emission of dust to the atmosphere during filling of the bag. Thus, dust-laden air from within the bag is drawn up into the dust collector or returns to the supply hopper (as indicated by the arrows in FIG. 2) and the powdered material is loaded into the bag via the inner delivery conduit.

In handling certain kinds of powdered material, or operating in proximity to combustible vapors, it is important that static electricity generated during loading and unloading of the powdered material be discharged to ground so as to prevent static sparking which in turn may cause an explosion of the powdered material or solvent/air mixture. Container 5 of this invention may be readily electrically grounded by making bag 9 electrically conductive and by electrically grounding the bag during loading and unloading of the fluent powdered material. As shown in FIG. 4, bag 9 is made of a non-conductive, air-impervious rubber or plastic coated fabric having an electrical conductive layer or surface 103 on its inner surface. For example, the electrically conductive surface may be an electro-deposited aluminum coating or sheet of aluminum foil bonded to the bag. Alternatively, bag 9 may be made of a homogeneous, electrical conductive film such as carbon-filled rubber or other suitable material. Upon forming hem 37 at the bottom of bag 9, metal clamping frame 33 bears directly against the conductive layer 103. By attaching a grounding wire 105 to the electrically conductive metal clamp ring 33, the container is effectively electrically grounded. Alternatively, container 5 may be made electrically conductive by providing an electrically conductive liner 107 (see FIG. 9) inside bag 9 in electrical contact with clamp ring 33. Of course, both bag 9 and liner 107 may be secured to collar 41 by means of clamp 49.

As previously mentioned, the system of this invention further involves unloading the load of dry fluent material from within container 5 in a relatively short time (e.g., about 2–4 minutes) without releasing any substantial quantity of dust to the atmosphere or without unnecessarily exposing personnel to the contents of the container. As is best shown in FIG. 6, unloading of container 5 is accomplished by removing plugs P from outlet 25 and from inlet 29 and by inserting a line or hose 109 in inlet 29 of base 7 to introduce compressed air into plenum chamber 23 thereby to effect fluidization of the load of powdered material contained within the bag. Outlet conduit 27 is sealably attached to outlet opening 25 in the base so that the fluidized powder may be readily conveyed away from the container. In some instances, the powder may be unloaded into a closed bulk holding tank from container 5. In these instances, the fluidized powder merely flows through the outlet conduit into a holding tank. In other instances, it may be desired to mix the fluidized powdered material with a liquid to form a solution or slurry. In these last-mentioned instances, outlet conduit 27 may be used as the powder inlet of a water-to-air eductor in a manner similar to that explained in U.S. Pat. No. 3,777,775 in which an eductor is used to generate a vacuum and to thus positively suck the fluidized material from container 5. Of course, once the powdered material has become mixed with a liquid to form a slurry or solution, there is little or no dust to escape.

Upon introduction of compressed air into plenum chamber 23 so as to fluidize the powdered load in bag 9, the air will percolate up through the powdered load and inflate the bag. As shown in FIG. 8, the top of the bag may be vented to relieve pressure from within the bag and to maintain an optimal pressure within the bag to support it by inflation without substantially reducing air flow required for fluidization of the powdered load. In order to vent the bag, dust plug 65 is removed from the center aperture 61 in cover 55 and a vent hose 111 having a probe 113 is inserted into the center aperture (see FIG. 6) to communicate with the interior of the bag. Thus, the fluidizing air from within the bag may be readily vented via the vent hose. A vent valve 115 is provided in hose 111 having a valve member 117 against which air pressure from within the bag acts. This valve member is movable (i.e., rotatable) between a closed position (as shown in FIG. 6) in which it substantially blocks the flow of air or other gas from within the bag and an open position (not shown) in which air or other gas from within the bag may be readily vented. The air pressure within the bag moves the valve member toward its open position and the valve member has a counterweight 119 secured thereto which biases the valve member toward its closed position. The counterweight may be adjusted so that a predetermined pressure level within the bag will be maintained thereby to hold the bag erect and to prevent it from slumping over during fluidization of the powder. The outlet of valve 115 may be connected to a dust collector or to a dust collector bag (not shown) so as to substantially prevent the emission of dust into the atmosphere.

After the unloading of the container, a small amount of powder (e.g., a few pounds) may remain within bag 9. By replacing cap 65 in center aperture 61 and by reinserting plugs P into outlet 25 and inlet 27, the container will again be sealably closed. Thus, during return shipment of containers 5 for reuse, spillage of powdered material or leakage of dust from within the container is substantially prevented. Upon refilling, cover 55 is removed and collar 41 is sealingly attached to filling apparatus 3 in such manner that personnel are not exposed to any residual dust within the container.

As shown in FIG. 2, a so-called dust pan 121 is mounted on frame 73 by a linkage support 123 for movement between a retracted position (as shown) in which it is clear of head 85 and bag 9 and a catch position (not shown) under fill tube 89 when the bag is removed from the head to catch any powder material which may fall from the delivery tube. A vibrator 125 is provided to shake fill tube 87 so as to knock loose most of the product clinging to the interior thereof prior to disconnecting collar 41 after container 7 has been filled. For example, vibrator 125 may be a vibrator commercially available from National Air Vibrator Company, of Houston, Tex.

In operation of the system 1 of this invention, a container 5 is placed on scale platform 69 and positioned generally under delivery head 85 of filling apparatus 3. Hooks 79 are attached to loops 77 on bag 9 and air cylinders 83 are actuated so as to rotate lifting arms 75 upwardly whereby the bag is held in substantially erect position (as shown in FIGS. 1 and 2). Collar 41 is then positioned beneath dust collecting conduit 89 and the hand-operated clamps 91 are operated so as to sealingly clamp the collar to the lower end of the dust collection tube. After the container has been sealably attached to the delivery head, the tare weight of the container is read out on digital read-out console 71 and then loading of the container is commenced. Grounding wire 105 is attached to clamp 33. As product enters the container via the fill tube 87, air from within the bag is sucked between the walls of the fill tube and the dust collection tube 89 and dust and air displaced from within the bag during filling are drawn off to a vacuum dust collector (not shown). As the weight of the product delivered to the container approaches the desired weight, the operator or an automatic shut-off activated by a signal from the scale will terminate the flow of product into the container. After filling is complete, vibrator 125 is energized to shake loose any powder that may cling to the interior of fill tube 87. The operator then releases clamps 91. Dust catch pan 121 is then moved into position under the fill tube to catch any powder that may fall from the fill tube. Cover 55 is then immediately snapped into place on collar 41 thereby sealing the contents of the container within the container. Air pressure is relieved from air cylinders 73 thereby to allow lines 81 to become slack and hooks 79 are removed from loops 77. Grounding wire 105 is detached from ring 33 and the filled container is then removed from the scale by a forklift or moved across a roller platform for transport and storing as required.

When it is desired to unload the powdered fluent material from within container 5, plugs P are removed from openings 25 and 29 in the base and outlet conduit 27 is sealably inserted into the outlet opening 25 and compressed-air line 109 is sealably inserted in inlet 29. Plug 65 is removed from center aperture 61 of cover 55 and probe 113 of vent line 111 is sealably inserted into the aperture. Upon introduction of compressed air into plenum chamber 23 via inlet 29, the powdered load bearing down on diaphragm 17 is uniformly fluidized. The fluidized material flows down the inclined slope of deck 15 toward outlet 25 so that the load may be readily discharged. Excess air within the bag is vented via vent valve 115 to a dust collector or the like. By adjusting counterweight 119, the vent valve may be readily set so as to maintain a desired pressure level within bag 9 during discharge for optimal support of the bag with the fluidized material therein.

It will be understood that delivery head 85 may be raised and lowered in a manner similar to which the delivery head in my above-mentioned U.S. Pat. No. 4,054,161 operates thereby to facilitate placement and removal of container 5 in the apparatus.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A closed system for filling a container with a load of powdered or granular fluent material substantially to prevent the escape of dust during filling of the container, said container having an opening at its top, said opening being defined by a substantially rigid collar, said collar having a sleeve, the upper portion of said container being secured to said sleeve in sealed relation, said system further comprising delivery means comprising filling means for delivery of said fluent material through the opening into said container and means for removing air from within said container displaced upon filling of the container substantially without the emission of dust to the atmosphere, said delivery means further comprising a delivery head including a first conduit that communicates with the filling means and a second conduit that communicates with the air removing means, and means for releasably securing said collar to said delivery means during filling, said delivery head engaging said collar in sealed relation, and both said first and second conduits being in communication with the interior of the container through the opening therein when said collar is secured to said delivery means.

2. A closed system as set forth in claim 1 wherein said collar has a compressible seal, said delivery head being engageable with said seal in sealed relation when said delivery means is secured to said collar.

3. A closed system as set forth in claim 2 wherein said collar has an upwardly facing groove for reception of said seal, a portion of said delivery head fitting into said groove and engaging said seal in sealed relation when said delivery means is secured to said container.

4. A closed system as set forth in claim 1 wherein said first conduit is smaller than said second conduit and is disposed therewithin with a space between said first and second conduits, said second conduit engaging said collar in sealed relation when said collar is secured to said delivery means.

5. A closed system as set forth in claim 4 wherein said releasable securing means comprises a plurality of clamps carried by said second conduit engageable with said collar, said clamps being movable between an unclamped position in which said clamps are free of said collar and a clamping position in which said clamps engage said collar and draw the latter into sealed relation with said second conduit.

6. A closed system as set forth in claim 1 wherein said container is a flexible wall bag, and wherein the upper end of said bag is secured to said collar in sealed relation.

7. A closed system as set forth in claim 6 wherein said container further comprises a substantially rigid base and means for securing said bag to said base in sealed relation.

8. A closed system as set forth in claim 6 wherein said container is electrically conductive, and wherein said container includes means for electrically grounding said bag thereby to minimize the buildup of static electricity on the container and on the load therein.

9. A closed system as set forth in claim 8 wherein said securing means is electrically conductive and is in electrical contact with said bag, said securing means being adapted to be electrically connected to ground.

10. A closed system as set forth in claim 9 wherein said bag is of a substantially limp, non-conductive sheet material including a layer of electrically conductive material, said layer being in electrical contact with said securing means.

11. A closed system as set forth in claim 10 wherein said layer is applied to and is integral with the inner face of said bag.

12. A closed system as set forth in claim 10 wherein said bag comprises an outer liner of limp sheet material and an inner liner of electrically conductive material, said inner liner being in electrical contact with said securing means.

13. A closed system as set forth in claim 7 further comprising a scale for weighing the quantity of fluent material delivered into the container being filled, said scale including means engageable with said bag for holding said bag in an erect position for engagement with said delivery means in sealed relation.

14. A closed system for filling a container with a load of powdered or granular fluent material, and for unloading the load from the container substantially without the escape of dust, said system comprising a container defining an enclosed volume for containing said load and being adapted for the pneumatic or fluidized unloading of the powdered load, an opening at the top of the container in communication with said volume, a porous diaphragm within the container at the bottom thereof defining the bottom of said volume, a plenum chamber between said diaphragm and the bottom of said container, an inlet in said container for the introduction of compressed gas into said plenum chamber, said gas permeating through said diaphragm so as to fluidize said fluent material, an outlet in said container for the discharge of fluidized material from the container, said opening at the top of the container being defined by a substantially rigid collar, said system further comprising delivery means comprising a delivery head that is adapted to be secured to said collar in sealed relation, said delivery means further comprising means communicating with said head for filling said container through said opening therein with said fluent material and for removing air through said opening therein from within said container displaced upon filling of the container substantially without the emission of dust, and means adapted for communication with said volume for venting said volume during fluidization of said load and for maintaining the pressure within said volume within a predetermined pressure range during unloading substantially without the emission of dust.

15. A closed system as set forth in claim 14 wherein said container further comprises a substantially rigid base, said diaphragm being secured to said base and said plenum chamber being between said base and said diaphragm.

16. A closed system as set forth in claim 15 wherein said inlet for the introduction of compressed gas and said discharge outlet are in said base.

17. A closed system as set forth in claim 15 wherein said container comprises a bag of flexible, air impervious material secured to said base in sealed relation, and wherein said collar further has a downwardly extending sleeve, the upper portion of said bag fitting around said sleeve, said container further comprising means for drawing up said bag on said sleeve and for securing said bag to said sleeve in sealed relation.

18. A closed system as set forth in claim 14 wherein said venting means comprises a vent valve adapted for communication with said volume during fluidization of said load, said vent valve having a valve member against which said gas pressure within said volume acts, said valve member being movable between a closed position in which it substantially blocks the flow of gas from said volume and an open position in which gas from within said volume may readily be vented, the gas pressure within said volume acting on said valve member to move it toward its open position, said vent valve having means for biasing said valve member toward its closed position, said biasing means being adjustable to regulate the air pressure with said volume during fluidization of the load within a predetermined pressure range, said valve having an outlet which is adapted to be connected to dust collection or emission controlling means.

19. A closed system for filling a container with a load of powdered or granular fluent material, and for unloading the load from the container substantially without the escape of dust, said system comprising a container adapted for receiving and containing said load and for fluidized unloading of said load, said container including a substantially rigid base, a bag of flexible sheet material sealably secured to said base for containing said load, a porous diaphragm in said container overlying said base and constituting the bottom of said bag, a plenum chamber between said diaphragm and said base, an inlet for the introduction of compressed gas into said plenum chamber, said compressed gas permeating through said diaphragm and fluidizing said load, an outlet in said container for the discharge of fluidized material, an opening in the top of the bag in communication with said bag, said opening being defined by a substantially rigid collar secured to said bag in sealed relation, said system further comprising delivery means comprising means for filling said container with said fluent material and means for removing dust and air from within said container displaced during filling, said delivery means further comprising a delivery head adapted to engage said collar in sealed relation, said head having a conduit therein in communication with the filling means for the delivery of said fluent material through said opening in said bag, said head being adapted to be operably connected to said air and dust removing means for controlling dust in the displaced air, said system further comprising a scale for weighing the fluent material delivered into the container during filling, said scale including means attachable to the bag for supporting the bag in an erect position with its collar secured to said head in sealed relation during filling.

20. A container into which a load of powdered granular, or other fluent material may be readily loaded and from which said load may be readily unloaded substantially without the escape of dust, said container comprising a substantially rigid base, a flexible wall bag secured to said base in sealed relation defining a volume for containing said load, a porous diaphragm in said container overlying said base and substantially constituting the bottom of said volume, a plenum chamber between said diaphragm and said base, an inlet for the introduction of compressed gas into said plenum chamber, said compressed gas permeating through said diaphragm and fluidizing said load, an outlet in said container for the discharge of fluidized material, an opening in the top of the bag in communication with said volume through which said load is delivered into said container during filling, said opening being defined by a substantially rigid collar secured to said bag in sealed relation, and a cover removably securable to said collar in sealed relation for closing said opening after the filling operation is completed.

21. A container as set forth in claim 20 wherein said collar has a compressible seal therearound and wherein said cover has an outer downwardly projecting flange adapted to interengage said collar thereby to secure said cover on said collar and an inner downwardly projecting flange adapted to engage said seal in sealed relation when said cover is secured on said collar.

22. A container as set forth in claim 21 wherein said collar has a groove therearound, said seal being disposed within said groove.

23. A container is set forth in claim 21 wherein said cover is made of a flexible synthetic resin material, said cover being so structured that its outer margin may be deformed to permit removal of the cover from the collar.

24. A container as set forth in claim 21 wherein said cover has an aperture therethrough providing communication with said volume when said cover is secured to said collar in sealed relation, said cover further comprising means for closing said aperture.

25. A container as set forth in claim 20 wherein said bag is electrically conductive, and wherein said container includes means for electrically grounding said bag during filling and unloading to minimize the buildup of static electricity on said bag.

26. A container as set forth in claim 25 further comprising electrically conductive means for securing said bag to said base in sealed relation, said grounding means being connected to said electrically conductive securing means, the latter being in electrical contact with said bag.

* * * * *